United States Patent
Mills (10) Patent No.: US 7,917,552 B2
(45) Date of Patent: *Mar. 29, 2011

(54) GENERATING COHERENT GLOBAL IDENTIFIERS FOR EFFICIENT DATA IDENTIFICATION

(75) Inventor: William Leonard Mills, Yacolt, WA (US)

(73) Assignee: Access Systems Americas, Inc., Sunnyvale, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/186,535

(22) Filed: Aug. 6, 2008

(65) Prior Publication Data

US 2008/0301197 A1 Dec. 4, 2008

Related U.S. Application Data

(60) Division of application No. 11/210,023, filed on Aug. 22, 2005, now Pat. No. 7,418,466, which is a continuation of application No. 10/159,077, filed on May 31, 2002, now Pat. No. 6,934,710.

(60) Provisional application No. 60/377,713, filed on May 2, 2002.

(51) Int. Cl.
*G06F 17/30* (2006.01)
*G06F 13/28* (2006.01)

(52) U.S. Cl. ........ 707/821; 707/953; 707/955; 711/108; 719/316

(58) Field of Classification Search .................. 707/704, 707/752, 803, 821, 953, 955; 711/108; 719/316
See application file for complete search history.

(56) References Cited

U.S. PATENT DOCUMENTS

| | | | | |
|---|---|---|---|---|
| 5,522,077 | A | * | 5/1996 | Cuthbert et al. .......... 707/103 R |
| 5,812,793 | A | | 9/1998 | Shakib et al. ................. 709/201 |
| 6,151,639 | A | | 11/2000 | Tucker et al. ................. 719/316 |
| 6,775,737 | B1 | * | 8/2004 | Warkhede et al. ........... 711/108 |

* cited by examiner

*Primary Examiner* — Fred I Ehichioya
(74) *Attorney, Agent, or Firm* — Berry & Associates P.C.

(57) ABSTRACT

A method and system thereof for identifying records are described. Records on a node are distinguished from other records on the node by assigning each record a unique local identifier. When a record is moved from one node to another node, a unique global identifier is assigned to the record. A translation technique is employed to map the local identifier to the global identifier (and vice versa).

31 Claims, 7 Drawing Sheets

| STARTING POINT | RANGE | OFFSET |
|---|---|---|
| M1 (24 BITS) | M2 (24 BITS) | M3 (128 BITS) |
| N1 (24 BITS) | N2 (24 BITS) | N3 (128 BITS) |

| OFFSET | RANGE | STARTING POINT |
|---|---|---|
| M3 (128 BITS) | M2 (24 BITS) | M1 (24 BITS) |
| N3 (128 BITS) | N2 (24 BITS) | N1 (24 BITS) |

GENERATING COHERENT GLOBAL IDENTIFIERS FOR EFFICIENT DATA IDENTIFICATION

CROSS REFERENCE TO RELATED APPLICATIONS

This application is a divisional application of application Ser. No. 11/210,023, entitled "Generating Coherent Global Identifiers for Efficient Data Identification," filed Aug. 22, 2005, now allowed, which is a continuation application of application Ser. No. 10/159,077, entitled "Generating Coherent Global Identifiers for Efficient Data Identification," filed May 31, 2002, now issued as U.S. Pat. No. 6,934,710, which claims priority to the co-pending provisional patent application Ser. No. 60/377,713, entitled "System and Method for Synchronizing Computer Databases," filed May 2, 2002, and assigned to the assignee of the present application. The subject matter in all the above-identified co-pending and commonly owned applications is incorporated herein by reference.

BACKGROUND OF THE INVENTION

1. Field of the Invention

The present invention relates generally to the field of databases. Specifically, the present invention relates to a method and system for synchronizing data between multiple nodes.

2. Related Art

In the realm of hand-held computer systems (commonly referred to as personal digital assistants or PDAs), it is not uncommon for a data set to exist and be maintained both on the PDA and on at least one other device. For example, a user may maintain a calendar or address book on both the user's PDA and on another computer system (e.g., a personal computer system such as a desktop or laptop).

The entries in the data set can be referred to as records or data objects. When a change is made to a record in the data set residing on one device (hereinafter, also referred to as a node), it is desirable to have the data set on the other node be updated as well, so that the data set is synchronized on both nodes. Accordingly, processes have been developed to facilitate synchronizing the data sets on both nodes. These synchronization ("sync") processes are known in the art.

It is becoming more common for people to use more than one computer system. Many people use a computer system at home and another one at work, for example. Traditionally, synchronization occurs between a PDA and a personal computer system (PC), one PC at a time. The data sets on each of the PCs may be somewhat different, and so sophisticated techniques are employed to ensure that the proper records are transferred between the PDA and each PC during synchronization.

However, the paradigm in which the PDA serves in essence as the nexus between the user's home and office computer systems is not as applicable as it once was. As computer systems are networked, multiple communication pathways between PDAs and computer systems can exist. Records may be frequently shared between users, and quite often are distributed and stored across many nodes. Some records may be accessible by multiple users working from different nodes. In any event, different users may update a record in different ways, and the modified record may be distributed over different pathways. Along the way, the record may be further modified.

Currently, each record in a data set is identified by a record identifier (record ID). The task of assigning IDs to records is relegated to the PDA. When the PDA receives or creates a new record, it assigns a new record ID. This scheme works reasonably well in the relatively closed system consisting of the user's PDA and PCs. However, as records are shared and distributed as described above, the conventional scheme results in the same record being identified by different record IDs on different PDAs, because each PDA assigns its own record IDs. With the same record being identified differently by each node, it is difficult to propagate the record, or changes to the record, across the nodes. If the record is identified differently at different nodes, then it becomes necessary to reconcile the record ID at one node with the record IDs at each of the other nodes. In essence, it becomes necessary to identify each record using each of its possible record IDs. This is equivalent to attaching multiple IDs to each record. As the record is distributed from node to node, the accumulation of record IDs by which the record may be known can become quite unwieldy. Therefore, the notion of each PDA assigning record IDs is not as workable as before.

Accordingly, what is needed is a new system and/or method for identifying records such that the same record is not assigned different record IDs. It is also important that different records not be given the same record ID. In addition, in the realm of PDAs, there are other factors to consider. For example, relative to PCs, PDAs have less memory capacity and less address space. Thus, it is desirable to minimize to a practical extent the memory resources needed by a record identification scheme. Thus, what is also needed is a record identification scheme that carefully allocates the available address space. The present invention provides a novel solution to these needs.

SUMMARY OF THE INVENTION

Embodiments of the present invention pertain to record identification schemes for identifying records such that the same record is not assigned different record IDs, and such that different records are not given the same record ID. In general, according to the various embodiments of the present invention, records on a node are distinguished from other records on the node by assigning each record a unique local identifier (UID). When a record is moved from one node to another node, a unique global identifier (GUID) is assigned to the record. A translation technique is employed to map the local identifier to the global identifier (and vice versa).

In one embodiment, a record having a GUID associated therewith is received. The GUID includes an offset and a local record identifier assigned by another node. The GUID is mapped to a UID that is assigned locally. The UID assigned by the local node comprises fewer bits than the GUID. In one embodiment, the UID includes 24 bits while the GUID includes 128 bits.

In the present embodiment, the UID is translated back to the GUID according to the mapping. The record, having the GUID associated therewith, can then be sent to another node.

In one embodiment, a record that is generated locally is assigned a UID. To translate the UID to a GUID, a range of UIDs is set aside in an address space and reserved for use with the locally generated records. An offset unique to the local node is associated with this range of UIDs. In one embodiment, the offset includes first bits identifying a version of an operating system used by the local node and second bits uniquely associated with the local node.

In the present embodiment, the starting point for the range of UIDs is defined using a randomly selected UID. A specified number of UIDs, numbered sequentially from the starting point, is allotted to the range. When a new record is generated locally, an unused UID is selected from the range and assigned to the new record. The GUID for the new, locally generated record is calculated by adding the offset to the UID.

In one embodiment, when a record is received from another node (e.g., an imported record), and the GUID associated with that record is not already mapped to a UID, an unused UID is selected from the address space, but from outside of the range of UIDs set aside for locally generated records. The unused UID is then associated with the GUID.

In another embodiment, for imported records, the unused UID selected as just described is used to define a second range. The unused UID is used as the minimum of the second range, and an offset is associated with the second range. When a record with a GUID that includes this offset is subsequently received, an unused UID from within the second range is assigned to that record.

In this latter embodiment, to facilitate translation between GUIDs and UIDs for imported records, other ranges of UIDs can be similarly defined within the address space. Associated with each of these ranges is a particular offset. When a record having a UID but not a GUID is received, the range that the UID falls within is determined. The offset associated with that range is added to the UID to generate a GUID.

In summary, the record identification schemes of the present invention provide an efficient use of memory resources and careful allocation of available address space. The schemes are backward compatible with legacy operating systems, and robust enough to handle apparently arbitrary record identifiers assigned using alternate schemes that may be associated with other platforms or operating systems. These and other objects and advantages of the present invention will be recognized by one skilled in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "sending" or "mapping" or "translating" or "identifying" or "allocating" or "allotting" or "defining" or "generating" or "selecting" or "associating" or "assigning" or "determining" the like, refer to the action and processes of a computer system (e.g., flowchart 700 of FIG. 7), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Implementation Platforms

Figure 1A:
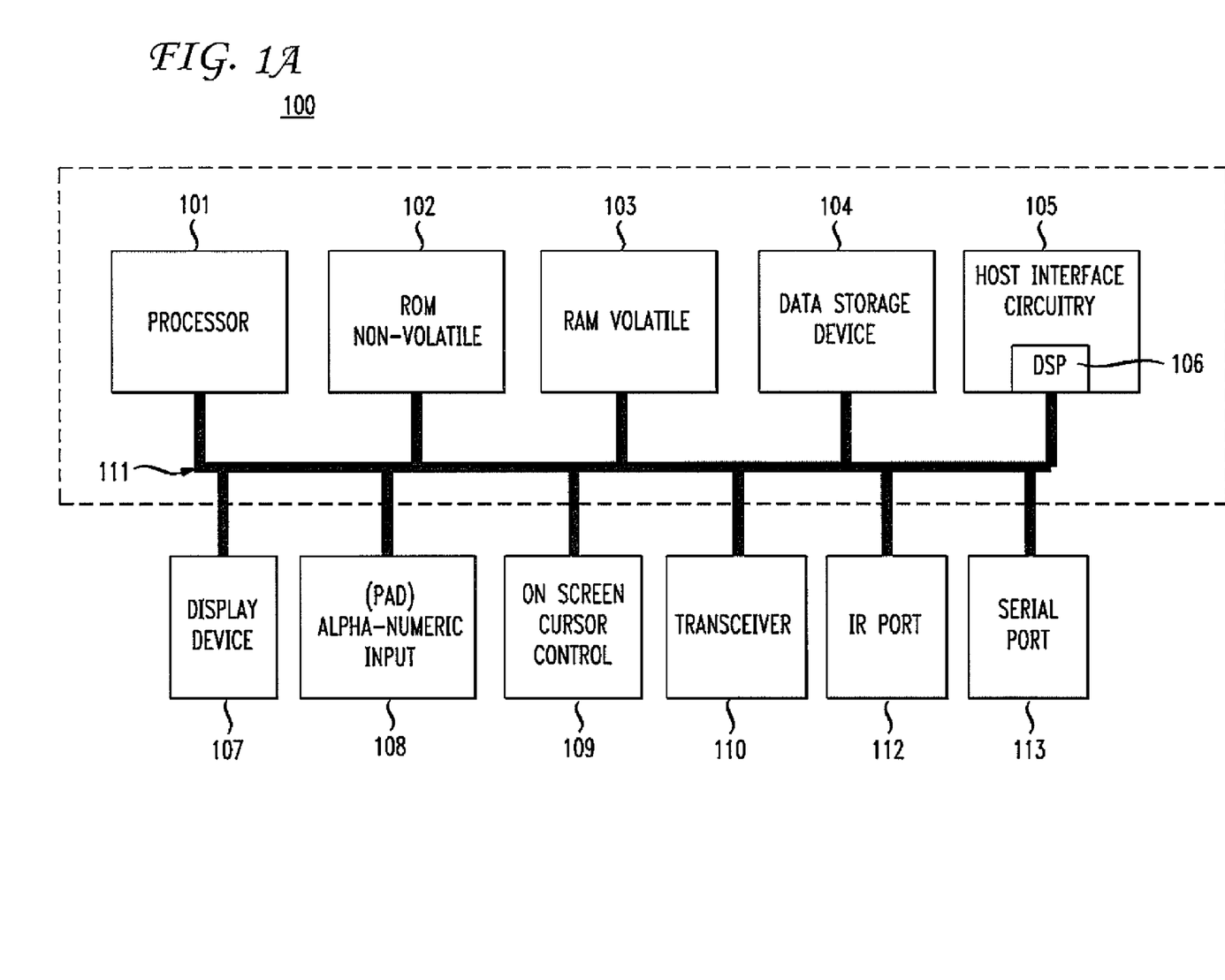
FIG. 1A is a block diagram of an exemplary hand-held computer system upon which embodiments of the present invention may be practiced.

FIG. 1A is a block diagram of one embodiment of a device 100 upon which embodiments of the present invention may be implemented. In one embodiment, device 100 is a hand-held computer system often referred to as a personal digital assistant (PDA) or a portable information device (PID). In its various implementations, device 100 may not include all of the elements illustrated by FIG. 1A, or device 100 may include other elements not described by FIG. 1A.

In one embodiment, device 100 includes an address data bus 111 for communicating information, a central processor 101 coupled with the bus 111 for processing information and instructions, a volatile memory 103 (e.g., random access memory, RAM) coupled with the bus 111 for storing information and instructions for the central processor 101, and a non-volatile memory 102 (e.g., read only memory, ROM) coupled with the bus 111 for storing static information and instructions for the processor 101. In the present embodiment, device 100 also includes an optional data storage device 104 (e.g., a Secure Digital card, a Multi Media Card, or the like) coupled with the bus 111 for storing information and instructions. Device 104 can be removable . . . . In one embodiment, device 100 also contains a display device 107 coupled to the bus 111 for displaying information to a user In the present embodiment, device 100 also includes a signal transmitter/receiver (transceiver) device 110, which is coupled to bus 111 for providing a wireless radio (RF) communication link between device 100 and other wireless devices. Transceiver 110 may be coupled to device 100 or integral with device 100.

In one embodiment, device 100 includes host interface circuitry 105 coupled to bus 111. Host interface circuitry 105 includes an optional digital signal processor (DSP) 106 for processing data to be transmitted or data that are received via transceiver 110. Alternatively, processor 101 can perform some or all of the functions performed by DSP 106. In one embodiment, host interface circuitry 105 comprises a universal asynchronous receiver-transmitter (UART) module that provides the receiving and transmitting circuits utilized for serial communication for both the infrared port 112 and the serial port 113.

In one embodiment, device 100 also includes an optional alphanumeric input device 108 that, in one implementation, is a handwriting recognition pad ("digitizer"). Alphanumeric input device 108 can communicate information and command selections to processor 101 via bus 111. In one embodiment, device 100 also includes an optional cursor control or directing device (on-screen cursor control 109) coupled to bus 111 for communicating user input information and command selections to processor 101. In one implementation, on-screen cursor control device 109 is a touch screen device incorporated with display device 107.

Figure 1B:
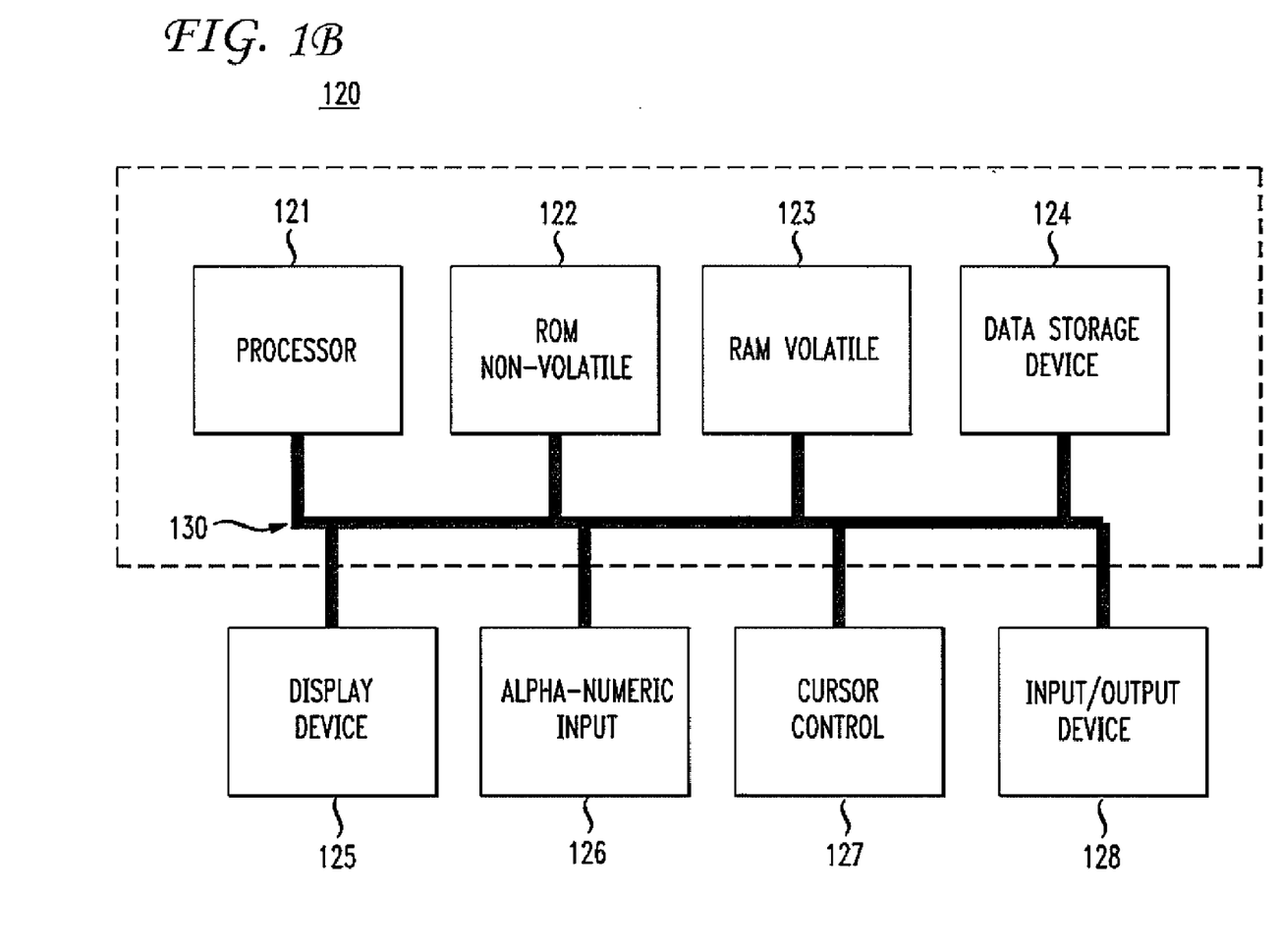
FIG. 1B is a block diagram of an exemplary desktop computer system upon which embodiments of the present invention may be practiced.

Refer now to FIG. 1B that illustrates an exemplary computer system 120 upon which embodiments of the present invention may be practiced. In its various implementations, device 120 may not include all of the elements illustrated by FIG. 1B, or device 120 may include other elements not described by FIG. 1B.

In general, computer system 120 comprises bus 130 for communicating information, processor 121 coupled with bus 130 for processing information and instructions, RAM 123 coupled with bus 130 for storing information and instructions for processor 121, ROM 122 coupled with bus 130 for storing static information and instructions for processor 121, data storage device 124 such as a magnetic or optical disk and disk drive coupled with bus 130 for storing information and instructions, an optional user output device such as display device 125 coupled to bus 130 for displaying information to the computer user, an optional user input device such as alphanumeric input device 126 including alphanumeric and function keys coupled to bus 130 for communicating information and command selections to processor 121, and an optional user input device such as cursor control device 127 coupled to bus 130 for communicating user input information and command selections to processor 121. Furthermore, input/output (I/O) device 128 is used to communicatively couple computer system 120 to another device (e.g., device 100 of FIG. 1A). I/O device 128 may be a device used for wired communication or for wireless communication.

Exemplary Synchronization Architecture

Figure 2:
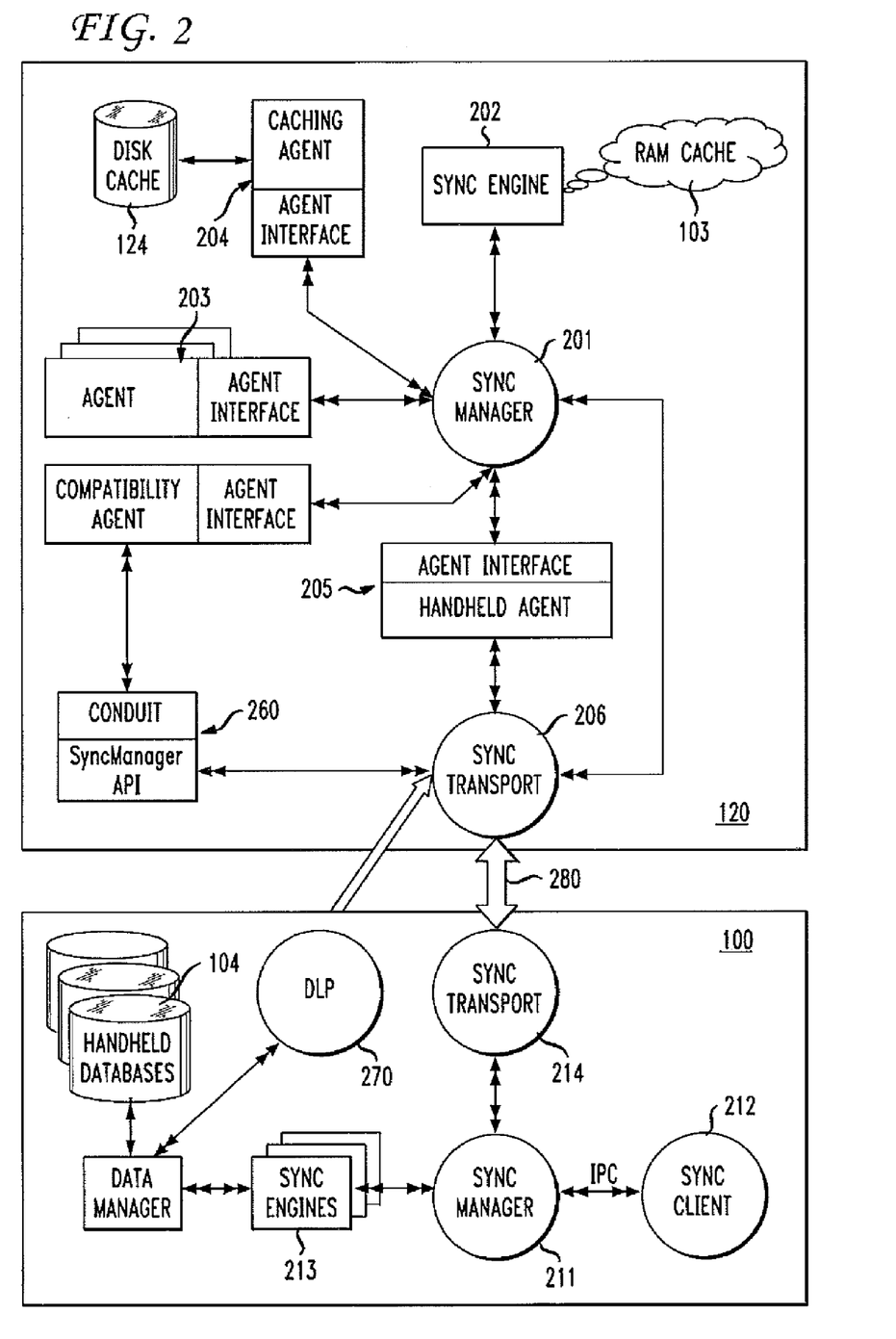
FIG. 2 is a block diagram showing the various elements of a synchronization architecture according to one embodiment of the present invention.

FIG. 2 is a block diagram showing the various elements of a synchronization architecture according to one embodiment of the present invention. Device 100 communicates with computer system 120, and vice versa, via open channel 280, which may be a wireless or a wired connection. Although described in the context of a device 100 (e.g., a PDA or hand-held computer system) in communication with a computer system 120 (e.g., a desktop computer system), it is appreciated that the synchronization architecture of FIG. 2 can also be used for peer-to-peer synchronization (e.g., PDA to PDA, or desktop to desktop). In addition, the synchronization architecture of FIG. 2 can be used with nodes having a master/slave relationship.

In the present embodiment, with regard to computer system 120, sync manager 201 works closely with sync engine 202 and the agents 203, 204 and 205. In this embodiment, sync manager 201 is a process that acts primarily as a scheduler and coordinator. It delegates data management to the agents 203, 204 and 205, and synchronization to sync engine 202.

According to an embodiment of the present invention, each agent 203, 204 and 205 communicates with a single endpoint. The term "endpoint" (or "farpoint") is used herein to refer to a source or destination of records (data objects) that are to be synchronized. For example, it is commonplace to synchronize a desktop calendar system database with a calendar database on a hand-held computer. In this example, the calendar database on the desktop computer is an endpoint, and the hand-held calendar database is another endpoint. Endpoints are generally data structures in permanent, or semi-permanent, computer memory. However, endpoints may be temporary, for example, a buffer in a wireless data protocol stack.

The sync manager 201 provides an application program interface (API) that allows any agent or application to start a full or partial sync session. These sessions can be tailored to a particular purpose and do not necessarily require the participation of another node (e.g., device 100). Sync manager 201 starts a sync session when it receives a start session request from another node (e.g., device 100).

In the present embodiment, the synchronization architecture of FIG. 2 also includes a conventional conduit and sync manager API 260, providing the functionality to synchronize with legacy devices.

With regard to device 100 (e.g., a hand-held computer system), the sync manager 211 works closely with sync client 212 and sync engines 213. The sync manager 211 is a system-level process that acts primarily as a protocol adapter for the sync engines 213. Sync manager 211 provides an API that allows any hand-held application to start a partial or full sync session with a specified target node; sync client 212 is one such application. Sync client 212 is a user-level process that provides configuration options and a session interface offering a cancel option. Desktop link server (DLP) 270 provides the functionality to synchronize legacy applications and databases and allows synchronization with legacy devices.

Exemplary Packet and Message Representations

Figure 3A:
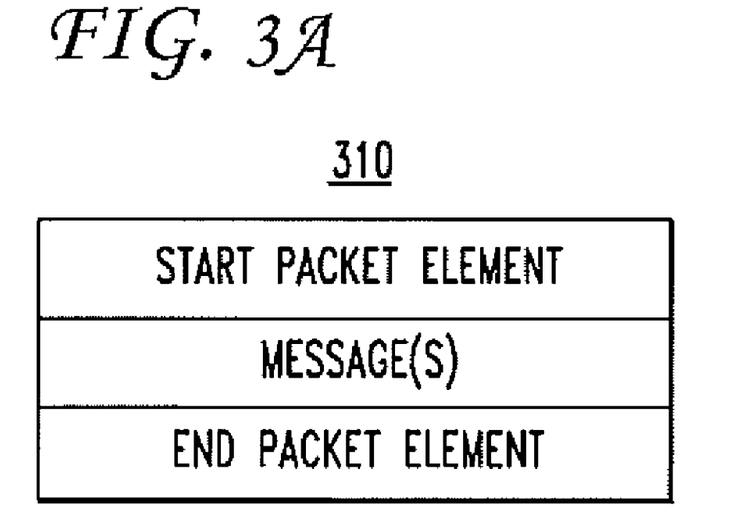
FIG. 3A is a representation of a synchronization packet according to one embodiment of the present invention.

FIG. 3A is a representation of a synchronization packet 310 according to one embodiment of the present invention. Sync packet 310 includes one or more sync messages. Sync packet 310 also includes a Start Packet element and an End Packet element.

The Start Packet element identifies the beginning of sync packet 310. It is outside of any message, has no element data, and has a length that is set to zero. The End Packet element identifies the end of sync packet 310 and will occur sometime after the start packet element. The End Packet element is outside of any sync message, does not have any element data, and has a length that is set to zero.

For each Start Packet element, there is a corresponding End Packet element. The elements and messages between the first occurrence of a Start Packet element and the corresponding End Packet element are parsed, and any element outside these two elements is ignored.

Figure 3B:
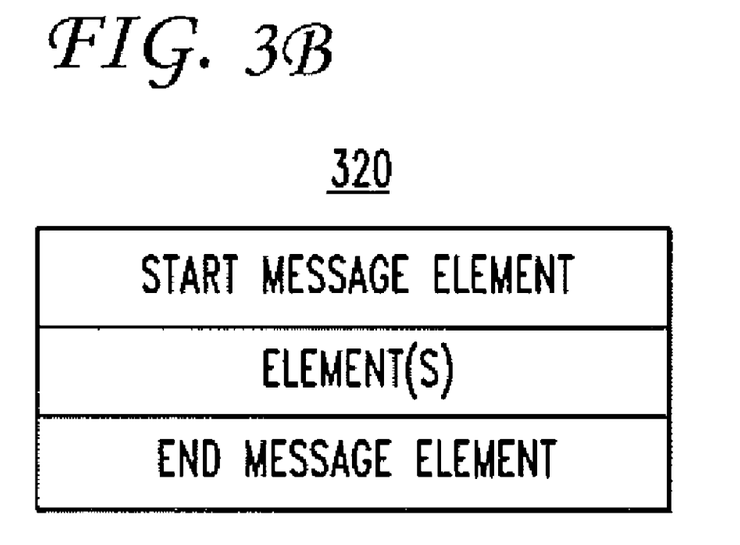
FIG. 3B is a representation of a synchronization message according to one embodiment of the present invention.

FIG. 3B is a representation of a synchronization message 320 according to one embodiment of the present invention. Each message consists of zero or more composite elements. A composite element includes one or more basic elements.

A basic element is a component of a composite synchronization element. Table 1 is a list of basic synchronization elements and their representation according to one embodiment of the present invention. It is appreciated that other basic element types can be defined and added to the list.

TABLE 1

Exemplary Basic Synchronization Elements

| Basic Element Name | Basic Element Data Type |
|---|---|
| Creator ID | DWORD |
| Type ID | DWORD |
| Database Name | STRING |
| Record/Object GUID | 16 bytes |
| Category GUID | 16 bytes |
| Data Source ID | 12 bytes |
| Clock Value | DWORD |
| User GUID | 16 bytes |

GUID refers to a global and unique identifier assigned to records/objects, categories and users. According to the present embodiment of the present invention, an identification scheme is implemented at each node to assign GUIDs. This scheme is described further below. The identification scheme ensures that each unique record/object, category and user is not given the same identifier by different nodes.

In the present embodiment, integral values are communicated in network byte order format. The record/object GUID, category GUID, data source ID, user GUID are fixed-length sequence of bytes and are not integral values. A data type 'STRING' is also introduced. The elements of type 'STRING' are represented as:

Field Length DWORD (N)
Field Value N UTF8 bytes (coded representation for all the characters of the UCS—Universal Character Set) (UTF8 refers to the Unicode Transformation Format-8 standard)

Global and Unique Record Identifiers

Figure 4:
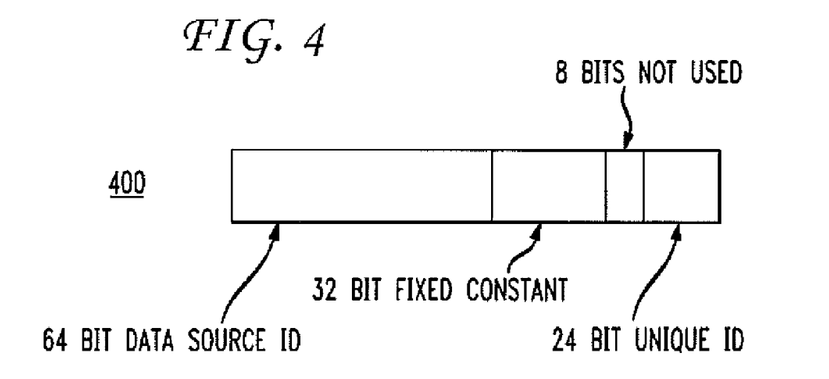
FIG. 4 is a representation of one embodiment of a global record identifier according to an embodiment of the present invention.

FIG. 4 is a representation of one embodiment of a global record identifier (GUID 400) according to an embodiment of the present invention. In this embodiment, GUID 400 is 128 bits in length. The use of 128-bit IDs is commonly supported in databases and is frequently used in various standards. The use of 128 bits is expected to be more than sufficient to uniquely distinguish one record from another across multiple nodes. Generally speaking, 128-bit IDs can accommodate a billion users, each with a billion records, all records being shared.

In the present embodiment, GUID 400 includes a 64-bit data source ID (DSID). As used herein, a data source may be a hand-held device (e.g., a PDA), a laptop or desktop computer system, a server, or the like. The 64-bit DSID is assigned sufficiently randomly so that no two data sources will have the same ID.

In the present embodiment, GUID 400 also includes a 32-bit fixed constant. In one embodiment, the 32-bit fixed constant is used to identify a version of the operating system employed by the node. Each of the operating systems is identified by a different set of 32 bits.

Also according to the present embodiment, GUID 400 includes a 24-bit local record identifier (UID). The use of 24 bits permits compatibility with legacy operating systems and platforms. These legacy operating systems and platforms provide for records to have 24-bit UIDs. The UIDs are generated sequentially from a starting point randomly selected in an address space. The use of 24 bits is considered adequate far distinguishing records from each other on the local device.

In the present embodiment, GUID 400 also includes eight (8) bits that are not used, in order to bring the total number of bits to 128. For example, these 8 bits can all be set to zero.

Generally speaking, as mentioned above, a length of 128 bits is selected for compatibility with common usage and current standards. Also, as illustrated in FIG. 4, the bits that constitute GUID 400 are in the following order, from most significant bits to least significant bits: the 64-bit DSID, the 32-bit fixed constant, the 8 bits not used, and the 24-bit UID. However, it is appreciated that a different order of bits can be used, particularly with regard to the 64-bit DSID, the 32-bit fixed constant, and the 8 bits not used. In one embodiment, the 24-bit UID preferably forms the least significant bits of GUID 400. As will be seen, this allows manipulation of the GUIDs and UIDs in a manner that efficiently reduces memory overhead. Namely, a prescribed offset can be added to a UID to generate a GUID. Different offsets are used and selected according to a mapping scheme described further below. It is appreciated that GUID 400 may include bits that pertain to other than the DSID, the operating system in place, or the like, and that a length other than 128 bits may be used.

In the present embodiment, GUID 400 utilizes a 24-bit UID because it allows ready translation of a record from one node to another, as will be seen. Moreover, as mentioned, use of a 24-bit UID provides compatibility with legacy record identification schemes. Thus, the record identification scheme of the present invention is backward compatible with legacy operating systems and platforms. In addition, conventional schemes used to generate 24-bit UIDs can continue to be used, and can be adapted for use with the record identification scheme of the present invention. However, it is appreciated that GUID 400 may not include the 24-bit UID. In general, GUID 400 should include a kernel of information, such as the 24-bit UID, to which an offset can be added in order to generate the GUID.

Figure 5:
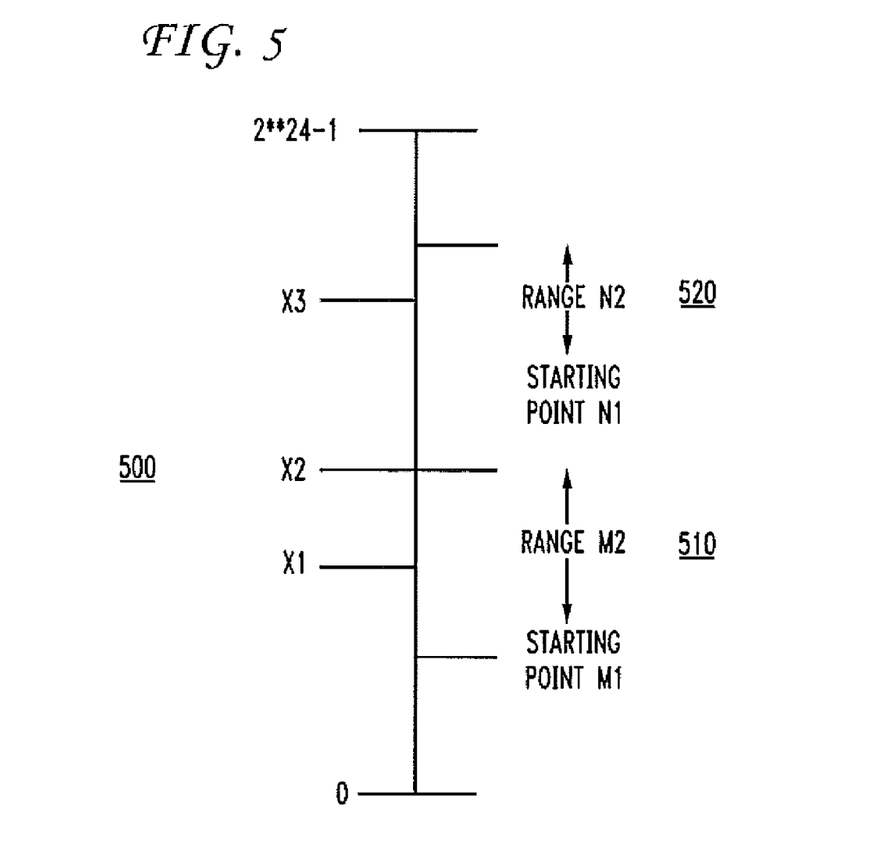
FIG. 5 is a representation of an address space according to one embodiment of the present invention.

FIG. 5 is a representation of an address space 500 according to one embodiment of the present invention. In this embodiment, the address space includes 2**24-1 entries; each entry is 24 bits in length, and the entry zero (0) is reserved to mean null.

In general, as mentioned above, a 128-bit GUID is used to distinguish records across multiple nodes and a 24-bit UID is used to distinguish records within a node. As such, each 128-bit GUID is mapped to a 24-bit UID and vice versa. Address space 500 is used to generate UIDs for locally generated records and to translate GUIDs for imported records to UIDs.

In the present embodiment, a portion of the 24-bit address space is allocated into a first range 510. First range 510 includes a portion of the 24-bit address space that is reserved for locally generated records. According to the present embodiment, first range 510 can be defined using a starting point MI and by specifying a number (M2) of UIDs to be included in first range 510. Note that MI is a 24-bit UID. In this embodiment, the UIDs in range 510 are numbered sequentially starting from MI. Also in this embodiment, the starting point MI is selected randomly. Note that a range may "wrap" around address space 500; that is, a range may extend up to and including the "top" of address space 500 and continue at the "bottom" of address space 500, excluding 0 (as mentioned, 0 is reserved to mean null).

In accordance with the present embodiment of the present invention, a first offset is uniquely associated with first range 510. As described above, in one embodiment, the offset includes a 64-bit DSID, a 32-bit fixed constant, and 8 bits not used.

Figure 6A:
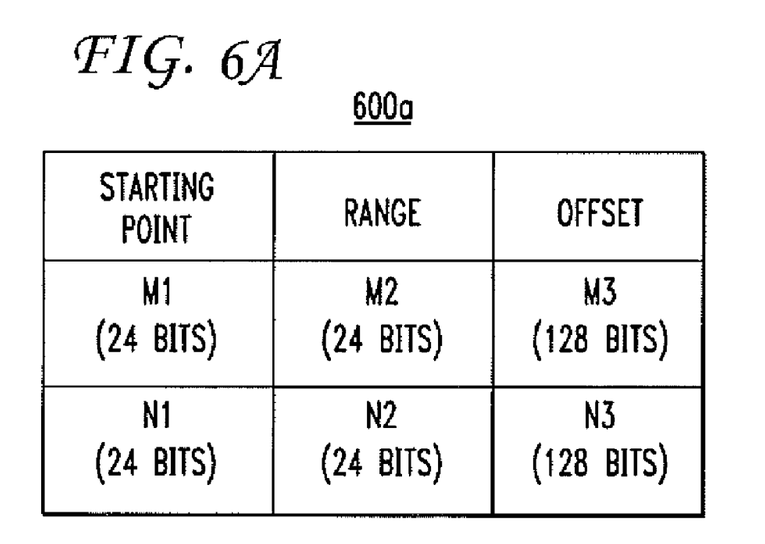
FIGS. 6A and 6B are examples of allocation tables for translating record identifiers according to one embodiment of the present invention.
Figure 6B:
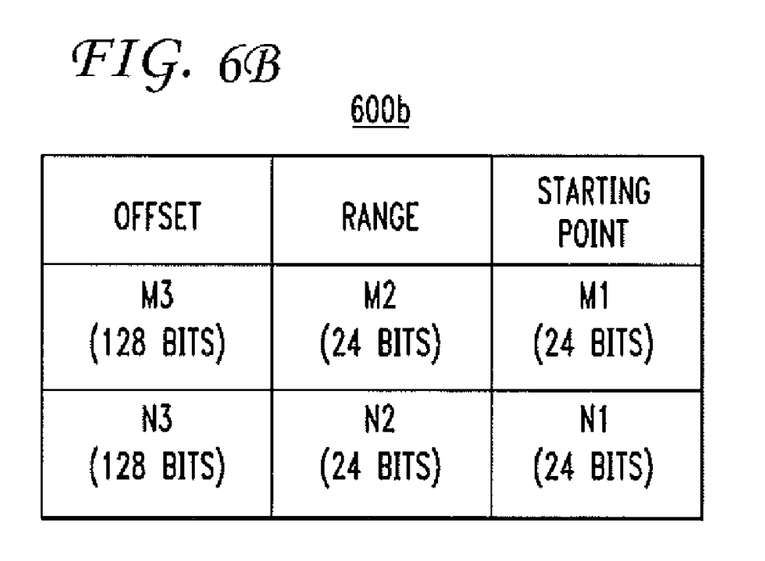

With reference now to FIG. 6A, according to one embodiment of the present invention, an allocation table 600a is used to record the parameters that define or are associated with first range 510. That is, allocation table 600a includes the starting point M1 that defines the minimum value of range 510, the range M2 which defines the number of UIDs included in range 510, and the offset M3 associated with first range 510. Allocation table 600a is sorted according to the UIDs, to facilitate a binary search of the table based on a UID. FIG. 6B shows an allocation table 600b sorted according to offsets, to facilitate a binary search based on a GUID.

By way of example, with reference to FIGS. 5, 6A and 6B, consider first the generation of a UID for a new, locally generated record. The new record is generated and address space 500 (specifically, range 510) is searched to find an unused UID. In this example, the new record is assigned a UID X1.

To convert UID X1 to a GUID, allocation table 600a is searched to find the largest starting address (starting point) that is less than or equal to X1. In this example, the largest starting point less than or equal to X1 is MI, and associated with MI is an offset of M3. Accordingly, X1 is converted to a GUID by adding the offset associated with M1 (e.g., an offset of M3) to X1. In the present embodiment, if the UID is outside the range 510, then a GUID of zero is returned.

Consider next the translation of a GUID to a UID for a locally generated record. According to the present embodiment of the present invention, allocation table 600a is searched to find a GUID offset that matches the information in the GUID. This search can be facilitated by instead using allocation table 600b. Once the GUID offset is found, it can be subtracted from the GUID to determine the UID. In this embodiment, if a GUID offset is not found, then a UID of zero is returned.

Now consider the generation of a UID from a GUID for an imported record. An imported record is used herein to refer to a record that was generated on a node other than the local node. In accordance with the present invention, the GUID may or may not have been generated by the other node using the record identification scheme described above. In general, the GUID will include an offset and a UID. However, as will be seen, the record identification scheme of the present invention is robust enough to handle arbitrarily generated GUIDs. In one embodiment, the GUID for the imported record may include a 64-bit DSID, a 32-bit fixed constant, 8 bits not used, and a 24-bit UID. The UID is assigned to the record by the node that initially generated the record. Note that the node sending the record may not be the node that initially generated the record.

With reference to FIGS. 5, 6A and 6B, when an imported record is received, allocation table 600a or 600b is checked to see if there is a compatible table entry. That is, allocation table 600a or 600b is searched for a GUID offset corresponding to the offset included in the GUID for the imported record. In this embodiment, the GUID offset includes the 64-bit DSID, a 32-bit fixed constant, and the 8 bits not used.

If there is no such entry in table 600a or 600b, then an entry is created for the imported record. In the present embodiment, this is accomplished by randomly selecting an address space 500 that is not within range 510. In this example, UID X2 is selected. Thus, in the present embodiment, the GUID for the imported record is mapped to UID X2. Note that the UID assigned by the local node may be different from the UID that was assigned to the record by the node that initially generated the record. That is, a record on one node may have a UID that is different than that of the same record on another node. However, the GUID assigned to that record will be the same across all nodes.

In one embodiment, the GUID for each imported record is individually mapped to a respective UID. In other words, each record will have an entry in allocation table 600a and/or 600b. When a record is to be sent (exported) to another node, the mapping is used to translate the respective UID back to its corresponding GUID. While this scheme provides a convenient mechanism for mapping GUIDs and UIDs, there is an associated memory cost because a GUID is stored for each UID.

In another embodiment, memory is more efficiently utilized by defining additional ranges for address space 500. In this latter embodiment, UID X2 is used as the starting point (e.g., as the minimum) of a second range 520. Second range 520 has a starting point N1 (N1 is a 24-bit UID) and a range N2; initially N1 is equal to X2. The GUID offset (N3) associated with the imported record is associated with second range 520. This information is recorded in allocation tables 600a and 600b of FIGS. 6A and 6B, respectively. Note that the relative positions of ranges 510 and 520 is arbitrary; that is, these ranges may be anywhere in address space 500, and first range 570 is not necessarily below second range 520. Note also that ranges 510 and 520 do not overlap.

When an imported record is received, its GUID offset is compared to the GUID offsets in tables 600a or 600b. If the GUID offset for the imported record is not found in tables 600a or 600b, an unused UID is selected and mapped to the GUID for the imported record. In addition, the selected UID is used as the starting point for a new range that is created in an empty area of address space 500 in a manner similar to that just described.

If the GUID offset for the imported record is found in tables 600a or 600b—for example, the GUID offset for the imported record corresponds to N3—then an unused UID from range 520 (e.g., UID X3) is selected and assigned to the imported record (that is, the UID is mapped to the GUID of the imported record). Note that the starting point and/or the size (e.g., the number of UIDs) of a range can be changed. For example, if an imported record is received with a GUID corresponding to range 520, but range 520 does not have any remaining unused UIDs, then range 520 can be increased in size by reducing N1 or by increasing N2, as long as range 520 does not overlap another range. There may be other reasons—why it is beneficial to adjust the starting point or size of a range.

The UID for an imported record is translated back to its corresponding GUID using allocation tables 600a or 600b. For example, to convert UID X3 back to its corresponding GUID, allocation table 600a or 600b is searched to find the largest starting address (starting point) that is less than or equal to X3. In this example, the largest starting point less than or equal to X3 is N1, and associated with N1 is an offset of N3. Accordingly, X3 is converted back to its corresponding GUID by adding the offset associated with N1 (e.g., an offset of N3) to X3. In the present embodiment, if the UID is outside the range 520, then a GUID of zero is returned.

The use of ranges in address space 500, as in the present embodiment, can save memory resources because it is not necessary to store a 128-bit GUID for each record. Instead, for each range of UIDs, a common GUID offset is stored one time for multiple records. The common GUID offset is then added to the UIDs for these records to calculate a GUID for each record in the range.

If an imported record has a GUID that was generated using some arbitrary record identification scheme, the GUID can be mapped to a UID on a one-to-one basis, with the mapping stored in allocation table 600a or 600b. That is, this case reduces to the case in which each GUID is individually mapped to a corresponding UID, and vice versa.

Figure 7:
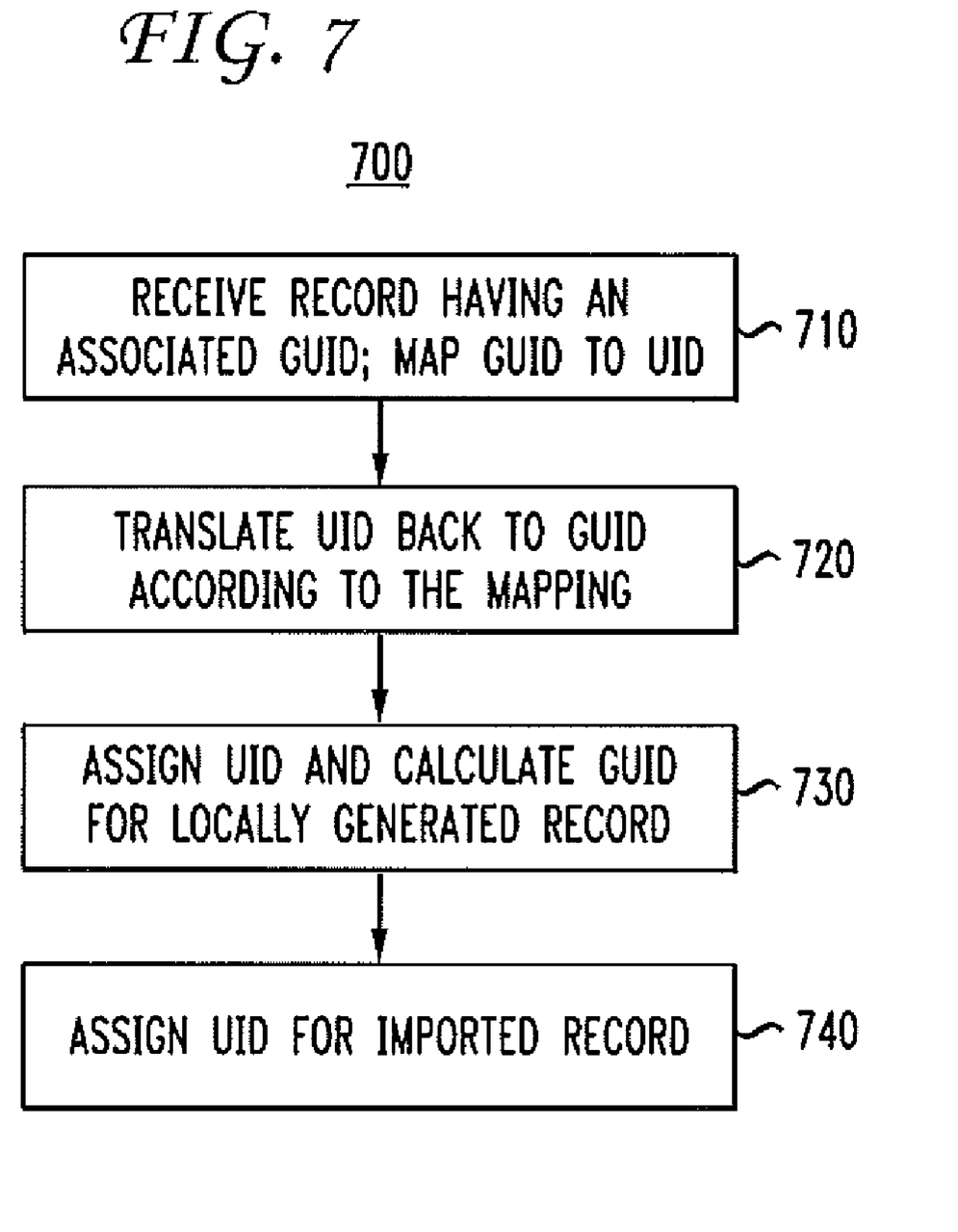
FIG. 7 is a flowchart of a method for identifying records in accordance with one embodiment of the present invention.

FIG. 7 is a flowchart 700 of a method for identifying records in accordance with one embodiment of the present invention. For simplicity of discussion, flowchart 700 is discussed in the context of a synchronization performed between two nodes. In the present embodiment, the method of flowchart 700 is implemented on one of the nodes. It is appreciated that the applicability of flowchart 700 can be extended to synchronization of more than two nodes. Furthermore, although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed.

In step 710, according to the present embodiment, a record having a GUID associated therewith is received. The GUID includes an offset and a local record identifier assigned by another node. The GUID is mapped to a UID assigned locally. The UID assigned by the local node comprises fewer bits than the GUID. In one embodiment, the UID includes 24 bits while the GUID includes 128 bits.

In step 720 of the present embodiment, the UID is translated back to the GUID according to the mapping. The record, having the GUID associated therewith, can then be sent to another node.

In step 730, in the present embodiment, a record that is generated locally is assigned a UID. To translate the UID to a GUID, a range of UIDs is set aside in an address space and reserved for use with the locally generated records. An offset unique to the local node is associated with this range of UIDs. In one embodiment, the first offset includes first bits identifying a version of an operating system used by the local node and second bits uniquely associated with the local node.

In the present embodiment, the starting point for the range of UIDs is defined using a randomly selected UID. A specified number of UIDs, numbered sequentially from the starting point, is allotted to the range. When a new record is generated locally, an unused UID is selected from the range and assigned to the new record. The GUID for the new, locally generated record is calculated by adding the offset to the UID.

In step 740 of the present embodiment, when a record is received from another node (e.g., an imported record), and the GUID associated with that record is not already mapped to a UID, an unused UID is selected from the address space, but from outside of the range of UIDs set aside for locally generated records. The unused UID is then associated with the GUID.

In one embodiment, for imported records, the unused UID selected as just described is used to define a second range. The unused UID is used as the minimum of the second range, and an offset is associated with the second range. When a record with a GUID that includes this offset is subsequently received, an unused UID from within the second range is assigned to that record.

In this embodiment, to facilitate translation between GUIDs and UIDs for imported records, other ranges of UIDs can be similarly defined within the address space. Associated with each of these ranges is a particular offset. When a record having a UID but not a GUID is received, the range that the UID falls within is determined. The offset associated with that range is added to the UID to generate a GUID.

In summary, the embodiments of the present invention provide a record identification schemes for identifying records such that the same record is not assigned different record IDS, and such that different records are not given the same record ID. In addition, the record identification schemes of the present invention provide an efficient use of memory resources and careful allocation of available address space.

The preferred embodiments of the present invention, generating coherent global identifiers for efficient data identification, are thus described. While the present invention has been described in particular embodiments, it should be appreciated that the present invention should not be construed as limited by such embodiments, but rather construed according to the below claims.

What is claimed is:

1. A method of maintaining coherency of records including global record identifiers at a node associated with memory resources, certain of the global record identifiers including a local record identifier, the method utilizing a processor and comprising the steps of:

reserving, in at least certain of the memory resources, a first memory address space for local record identifiers of records generated at the node and a second memory address space for local record identifiers of records generated at a remote source and received at the node;

generating a local record identifier for certain records created at the node or received from the remote source; and storing locally generated local record identifiers in the first memory address space and remotely generated local record identifiers in the second memory address space assigning each record the local record identifier generated to distinguish the record from other records within a single or multiple nodes and assigning a unique global identifier to facilitate exporting the record from the single node to another one of the multiple nodes;

mapping the global record identifier to the local record identifier assigned by the single node, wherein the local record identifier assigned by the single node comprises fewer bits than the global record identifier;

translating the local record identifier to the global record identifier according to the mapping operation; and allocating a first range of local record identifiers in the address space, the address space comprising a plurality of local record identifiers, the first range comprising a portion of the plurality of local record identifiers, a starting point of which first range is selected according to a criteria, the first range of local record identifiers reserved for use with records generated by the single node, wherein a first offset uniquely associated with the single node is associated with the first range.

2. The method of claim 1, further comprising the steps of:
associating the first memory address space with a first mapping parameter of a locally generated global record identifier and the second memory address space with a second mapping parameter of a remotely generated global record identifier; and mapping the global record identifier from the local record identifiers in the first memory address space using the first mapping parameter and from the local record identifiers in the second memory address using the second mapping parameter.

3. The method of claim 2, wherein the first mapping parameter is a first offset and the second mapping parameter is a second offset different in value from the first offset.

4. The method of claim 3, further comprising the steps of:
receiving a global record identifier from a remote source; and
comparing an offset of the received global record identifier to the second offset.

5. The method of claim 4, wherein if the offset of the global record identifier does not match the second offset, further comprising the steps of:
selecting an unused local record identifier;
mapping the global record identifier to the selected local record identifier; and
creating a new memory a new memory address space starting at the selected local record identifier.

6. The method of claim 4, wherein if the offset of the global record identifier does not match the second offset, further comprising the steps of:
selecting an unused local record identifier within the second memory address space; and
mapping the global record identifier to the selected local record identifier.

7. A method according to claim 1, wherein the first offset includes first bits that identify a version of an operating system used by the local node and second bits uniquely associated with the single node.

8. A method according to claim 1, wherein the criteria for selecting the starting point of the first range is random.

9. A method according to claim 1, wherein the criteria for selecting the starting point is pre-defined.

10. A method according to claim 1, wherein a specified number of local record identifiers are numbered sequentially from the starting point.

11. A method according to claim 10, wherein in the event of generating a new record locally, an unused one of the local record identifiers is selected from the specified number of local record identifiers and assigned to the new record.

12. A method according to claim 11, wherein the global record identifier for the new record is formulated by adding the first offset to the local record identifier for the new record.

13. A method according to claim 10, wherein in the event of importing a record from another mode and there being no global record identifier, an unused one of the local record identifiers is selected from outside the specified number of local record identifiers.

14. A method according to claim 13, wherein the unused one of the local record identifiers is used to define a second range where the unused local record identifier is used as the minimum value of the second range and an offset is associated with the second range.

15. A method according to claim 14, wherein in the event a record with a global record identifier that includes the offset is subsequently received, an unused local record identifier from within the second range is assigned to the record.

16. An electronic device, comprising:
a data communication interface;
a memory unit including a divisible address space; and
a processor coupled to the data communication interface and the memory unit and adapted to maintain coherency of records including use of global record identifiers by further comprising:
program instructions for reserving, at the memory unit, a first memory address space for local record identifiers of records generated at the electronic device and a second memory address space for local record identifiers of records generated at a remote source and received via the data communication interface;
program instructions for generating a local record identifier for each record created at the electronic device or received from the remote source; and
program instructions for directing the memory unit to store locally generated local record identifiers in the first memory address space and remotely generated local record identifiers in the second memory address space
wherein the processor maintains coherency of records including global record identifiers by identifying records in a single or in multiple nodes having memory resources, wherein each of global record identifiers include a local record identifier, said processor of the electronic device further comprising:
program instructions for assigning each record a unique local identifier used to distinguish the record from other records within a single or multiple nodes and assigning a unique global identifier to facilitate exporting the record from the single node to another one of the multiple nodes;
program instructions for mapping the global record identifier to the local record identifier assigned by the single node, wherein the local record identifier assigned by the single node comprises fewer bits than the global record identifier;
program instructions for translating the local record identifier to the global record identifier according to the mapping operation; and
program instructions for allocating a first range of local record identifiers in an address space, the address space comprising a plurality of local record identifiers, the first range comprising a portion of the plurality of local record identifiers, a starting point of which first range is selected according to a criteria, the first range of local record identifiers reserved for use with records generated by the single node, wherein a first offset uniquely associated with the single node is associated with the first range.

17. The electronic device of claim 16, wherein the processor is further adapted to:
associate the first memory address space with a first mapping parameter of a locally generated global record identifier and the second memory address space with a second mapping parameter of a remotely generated global record identifier; and
map the global record identifier from the local record identifiers in the first memory address space using the first mapping parameter and from the local record identifiers in the second memory address using the second mapping parameter.

18. The electronic device of claim 17, wherein the first mapping parameter is a first offset and the second mapping parameter is a second offset different value from the first offset.

19. The electronic device of claim 18, wherein the processor is further adapted to receive a global record identifier from a remote source and comparing an offset of the received global record identifier to the second offset.

20. An electronic device according to claim 16, wherein the criteria for selecting the starting point of the first range is random.

21. An electronic device according to claim 20, wherein a specified number of local record identifiers are numbered sequentially from the starting point.

22. An electronic device according to claim 16, wherein the criteria for selecting the starting point is pre-defined.

23. A synchronization system with a processor for maintaining coherency of records when updating data between multiple nodes by assigning global record identifiers at a node having one or more memory resources, each of the global record identifiers including a local record identifier, the synchronization system comprising:
  means for reserving, in the memory resources, a first memory address space for local record identifiers of records generated at the node and a second memory address space for local record identifiers of records generated at a remote source and received at the node;
  means for generating a local record identifier for each record created at the node or received from the remote source; and
    means for storing locally generated local record identifiers in the first memory address space and remotely generated local record identifiers in the second memory address space
    means for assigning each record a unique local record identifier to distinguish the record from other records within a single or multiple nodes and assigning a unique global identifier to facilitate exporting the record from the single node to another one of the multiple nodes;
    means for mapping the global record identifier to the local record identifier assigned by the single node, wherein the local record identifier assigned by the single node comprises fewer bits than the global record identifier;
    means for translating the local record identifier to the global record identifier according to the mapping operation; and
  means for allocating a first range of local record identifiers in an address space, the address space comprising a plurality of local record identifiers, the first range comprising a portion of the plurality of local record identifiers, a starting point of which first range is selected according to a criteria, the first range of local record identifiers reserved for use with records generated by the single node, wherein a first offset uniquely associated with the single node is associated with the first range.

24. A synchronization system as defined in claim 23, further comprising:
  means for associating the first memory address space with a first mapping parameter of a locally generated global record identifier and the second memory address space with a second mapping parameter of a remotely generated global record identifier; and
  means for mapping the global record identifier from the local record identifiers in the first memory address space using the first mapping parameter and from the local record identifiers in the second memory address using the second mapping parameter.

25. A synchronization system as defined in claim 24, wherein the first mapping parameter is a first offset and the second mapping parameter is a second offset different value from the first offset.

26. A synchronization system as defined in claim 25, further comprising:
  means for receiving a global record identifier from a remote source; and
  means for comparing an offset of the received global record identifier to the second offset.

27. A synchronization system as defined in claim 26, if the offset of the global record identifier does not match the second offset, further comprising:
  means for selecting an unused local record identifier;
  means for mapping the global record identifier to the selected local record identifier; and
  means for creating a new memory a new memory address space starting at the selected local record identifier.

28. A synchronization system as defined in claim 27, wherein if the offset of the global record identifier does not match the second offset, the system further comprises:
  means for selecting an unused local record identifier within the second memory address space; and
  means for mapping the global record identifier to the selected local record identifier.

29. A synchronization system according to claim 23, wherein the criteria for selecting the starting point of the first range is random.

30. A synchronization system according to claim 29, wherein a specified number of local record identifiers are numbered sequentially from the starting point.

31. A synchronization system according to claim 23, wherein the criteria for selecting the starting point is pre-defined.

* * * * *